(12) United States Patent
Li

(10) Patent No.: US 10,395,246 B2
(45) Date of Patent: Aug. 27, 2019

(54) SYSTEM AND METHOD FOR VERIFYING IDENTITY INFORMATION USING A SOCIAL NETWORKING APPLICATION

(71) Applicant: Tencent Technology (Shenzhen) Company Limited, Shenzhen (CN)

(72) Inventor: Maocai Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 1065 days.

(21) Appl. No.: 14/563,942

(22) Filed: Dec. 8, 2014

(65) Prior Publication Data
US 2015/0188915 A1 Jul. 2, 2015

Related U.S. Application Data

(63) Continuation of application No. PCT/CN2014/082482, filed on Jul. 18, 2014.

(30) Foreign Application Priority Data

Dec. 30, 2013 (CN) .......................... 2013 1 0745364

(51) Int. Cl.
*G06Q 20/40* (2012.01)
*G06F 21/42* (2013.01)
*H04L 29/06* (2006.01)

(52) U.S. Cl.
CPC ............ *G06Q 20/40* (2013.01); *G06F 21/42* (2013.01); *G06Q 20/4014* (2013.01); *H04L 63/126* (2013.01)

(58) Field of Classification Search
CPC .... G06Q 20/40; G06Q 20/18; G06Q 20/4014; G06Q 50/01

(Continued)

(56) References Cited

U.S. PATENT DOCUMENTS 8,503,629 B2 * 8/2013 Strope .................... H04L 12/66
379/93.24
8,589,266 B2 * 11/2013 Liu ........................ G06Q 20/10
705/35

(Continued)

FOREIGN PATENT DOCUMENTS

CN 102387483 A 3/2012
CN 102594817 A 7/2012
CN 103152704 A 6/2013

OTHER PUBLICATIONS

"A 2D Barcode-Based Mobile Payment System"; Jerry Gao, Vijay Kulkarni, Himanshu Ranavat, Lee Chang, Hsing Mei; (Year: 2009).*

(Continued)

*Primary Examiner* — Mamon Obeid
*Assistant Examiner* — Edgar R Martinez-Hernandez
(74) *Attorney, Agent, or Firm* — Morgan, Lewis & Bockius LLP

(57) ABSTRACT

A method of verifying identity information is performed at a computer server using a social networking application. The computer server receives an identity verification request from a first terminal. The first terminal is associated with a first account of the social networking application and the identity verification request includes information of a verification code and a second account of the social networking application. The computer server then forwards information of the verification code to a second terminal associated with the second account of the social networking application. Upon receipt of a response from the second terminal, the computer server establishes a relationship between the first account and the second account after verification of the response from the second terminal using the verification code such that the second terminal can interact with the first terminal through the social networking application.

11 Claims, 11 Drawing Sheets

(58) Field of Classification Search
USPC .......................................................... 705/75
See application file for complete search history.

(56) References Cited

U.S. PATENT DOCUMENTS

| | | | | |
|---|---|---|---|---|
| 9,565,263 B2* | 2/2017 | Lin | ........................ | H04L 67/26 |
| 9,640,001 B1* | 5/2017 | Vazquez | ............ | G07C 9/00007 |
| 2009/0178125 A1* | 7/2009 | Barber | .................... | G06F 21/31 |
| | | | | 726/6 |
| 2010/0302175 A1* | 12/2010 | Fratti | .................... | G06F 3/0488 |
| | | | | 345/173 |
| 2012/0227086 A1* | 9/2012 | Dale | ..................... | G06Q 50/01 |
| | | | | 726/3 |
| 2013/0124422 A1* | 5/2013 | Hubert | ............... | G06Q 20/3827 |
| | | | | 705/71 |
| 2013/0191290 A1* | 7/2013 | Glendenning | ......... | G06Q 20/20 |
| | | | | 705/71 |
| 2013/0219479 A1* | 8/2013 | DeSoto | ................. | H04W 12/06 |
| | | | | 726/6 |
| 2014/0074895 A1* | 3/2014 | Ingerman | ............... | G01C 21/00 |
| | | | | 707/803 |
| 2014/0143137 A1* | 5/2014 | Carlson | ................. | G06Q 20/02 |
| | | | | 705/39 |
| 2015/0310686 A1* | 10/2015 | Backert | ................. | G07C 13/00 |
| | | | | 705/12 |

OTHER PUBLICATIONS

"Automatic Mobile Payment on a non-Connected Vending Machine"; Seyed Bahram ZahirAzami, Mohammad Tanabian; (Year: 2004).*
Tencent Technology, IPRP, PCT/CN2014/082482, dated Jul. 5, 2016, 5 pgs.
Tencent Technology, ISRWO, PCT/CN2014/082482, dated Oct. 27, 2014, 7 pgs.

* cited by examiner

SYSTEM AND METHOD FOR VERIFYING IDENTITY INFORMATION USING A SOCIAL NETWORKING APPLICATION

RELATED APPLICATIONS

This application is a continuation application of PCT Patent Application No. PCT/CN2014/082482, entitled "SYSTEM AND METHOD FOR VERIFYING IDENTITY INFORMATION USING A SOCIAL NETWORKING APPLICATION" filed on Jul. 18, 2014, which claims priority to Chinese Patent Application No. 201310745364.8, "VERIFICATION INFORMATION PUSHING AND INFORMATION VERIFICATION METHODS, APPARATUSES, AND SYSTEMS," filed on Dec. 30, 2013, both of which are hereby incorporated by reference in their entirety.

FIELD OF THE TECHNOLOGY

The present disclosure relates to the field of computer information verification technologies, and in particular, to verification information pushing and information verification methods, apparatuses, and systems.

BACKGROUND OF THE DISCLOSURE

Nowadays, with the constant development of computer technologies and network technologies, people can enjoy services provided by various businesses and service providers through the Internet almost at any time and in any place. In network activities, how to ensure a secure network environment is a major issue that needs to be considered.

Currently, lots of technologies for ensuring network security have been developed, which have different advantages and disadvantages and therefore are used by different users. Among these technologies, a security technology based on a verification code, which is simple and easy to implement, is widely used.

A verification code, as a verification manner, can effectively avoid malicious decryption, cheating in online voting, and malicious posting on a forum; and can also protect a certain specific registered user from repeated login attempts in a manner of brute force cracking.

An existing manner for pushing a verification code is generally as follows: in a verification scenario where a user performs user registration, sends a message, downloads data, or makes a payment, a box for filling a verification code is displayed; then, a verification code pops up automatically, so as to require the user to input the verification code. For the existing manner for pushing a verification code, a verification code and other information corresponding to a verification scenario exist in a same web page; as a result, an illegal user can also extract specific content of the verification code in a manner of word or picture recognition. Therefore, the verification code losses corresponding effectiveness and to some extent cannot ensure network security for the user.

SUMMARY

The above deficiencies and other problems (e.g., security issues) associated with the conventional approach of identity verification are reduced or eliminated by the present application disclosed below. In some embodiments, the present application is implemented in a computer server that has one or more processors, memory and one or more modules, programs or sets of instructions stored in the memory for performing multiple functions and communicating with one or more client devices (e.g., a vending machine or a smartphone) that has one or more processors, memory and one or more modules, programs or sets of instructions stored in the memory for performing multiple functions. Instructions for performing these functions may be included in a computer program product configured for execution by one or more processors.

One aspect of the present application involves a method of verifying identity information performed at a computer server using a social networking application, the computer server having one or more processors and memory storing program modules to be executed by the one or more processors. The computer server receives an identity verification request from a first terminal. The first terminal is associated with a first account of the social networking application and the identity verification request includes information of a verification code and a second account of the social networking application. The computer server then forwards information of the verification code to a second terminal associated with the second account of the social networking application. Upon receipt of a response from the second terminal, the computer server establishes a relationship between the first account and the second account after verification of the response from the second terminal using the verification code such that the second terminal can interact with the first terminal through the social networking application.

Another aspect of the present application involves a computer server including one or more processors, memory, one or more program modules stored in the memory and to be executed by the one or more processors. The program modules further include: a request receipt module for receiving an identity verification request from a first terminal, wherein the first terminal is associated with a first account of the social networking application and the identity verification request includes information of a verification code and a second account of the social networking application; a request forwarding module for forwarding information of the verification code to a second terminal associated with the second account of the social networking application; a response receipt module for receiving a response from the second terminal; and an account relationship generation module for, after verification of the response from the second terminal using the verification code, establishing a relationship between the first account and the second account such that the second terminal can interact with the first terminal through the social networking application.

Another aspect of the present application involves a non-transitory computer readable storage medium stores one or more program modules in connection with a computer server having one or more processors, the program modules including instructions for execution by one or more processors. The instructions, when executed by the one or more processors, cause the computer server to: receive an identity verification request from a first terminal, wherein the first terminal is associated with a first account of the social networking application and the identity verification request includes information of a verification code and a second account of the social networking application; forward information of the verification code to a second terminal associated with the second account of the social networking application; receive a response from the second terminal; and after verification of the response from the second terminal using the verification code, establish a relationship between the first account and the second account such that the second terminal can interact with the first terminal through the social networking application.

Various advantages of the present application are apparent in light of the descriptions below.

BRIEF DESCRIPTION OF THE DRAWINGS

The aforementioned features and advantages of the disclosure as well as additional features and advantages thereof will be more clearly understood hereinafter as a result of a detailed description of preferred embodiments when taken in conjunction with the drawings.

To illustrate the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
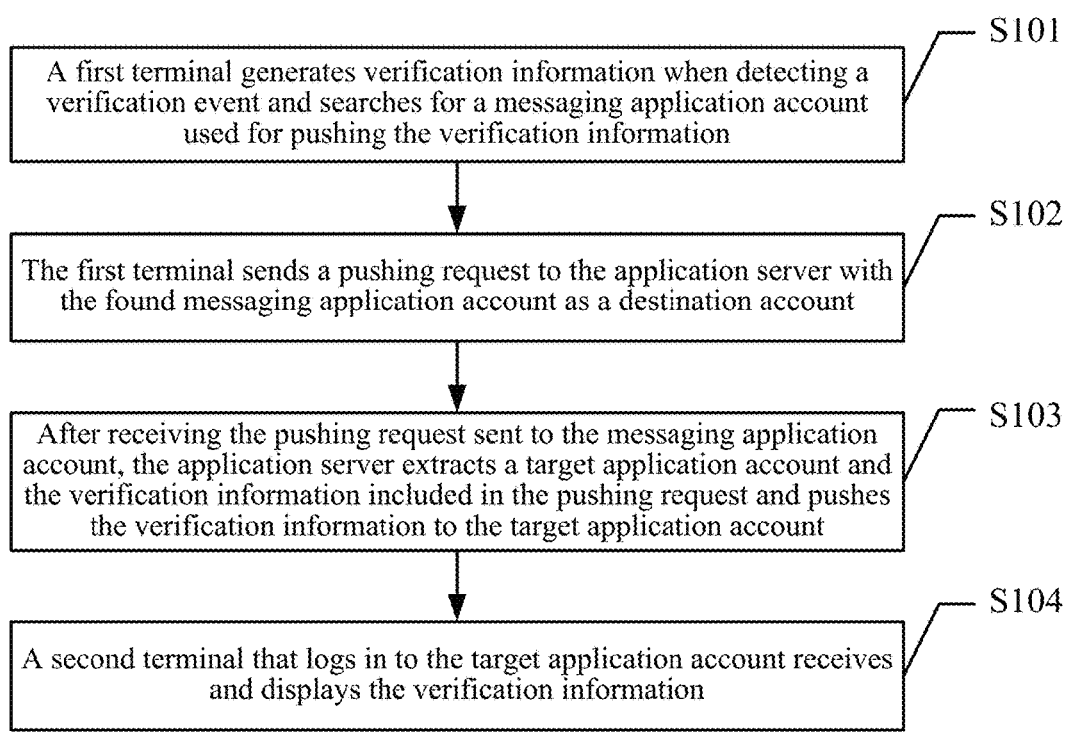
FIG. 1 is a schematic flowchart of a verification information pushing method according to an embodiment of the present disclosure.

FIG. 1 is a schematic flowchart of a verification information pushing method according to an embodiment of the present disclosure. The method in the embodiment of the present disclosure may be implemented between application servers, such as an instant messaging application and a social messaging application, and all types of service provider devices and smart user terminals. Specifically, the method includes:

Step 101: A first terminal generates verification information when detecting a verification event and searches for a messaging application account used for pushing the verification information. Note that, a client is also referred to as a client device, a terminal, or a terminal device in the present application.

The first terminal is a service provider device, and may include a personal computer, a notebook computer, and even a server used by a service providing user that provides related services. The detecting a verification event includes: detecting an account registering event of a user, detecting a service or commodity purchase event of a user, and detecting a downloading or message sending event, or other user operating events that need sending verification information to verify the user.

After detecting the verification event, the first terminal may randomly generate a group of verification information including characters, numbers, or a combination of characters and numbers. The verification information may specifically include one or more of character verification information, picture verification information, audio verification information, and video verification information.

The messaging application account used for pushing the verification information is a special account provided by a related application server. After receiving a pushing request sent to the messaging application account, the application server correspondingly performs an operation of extracting the verification information and a target application account from the pushing request, so as to send the verification information to the target application account.

The target application account is a user account indicated by the verification event. Specifically, for example, when the verification event is the account registering event of the user, the target application account may be a user contact account, such as an instant messaging application account or a social messaging application account bound to the user as specified during registration.

Step 102: The first terminal sends the pushing request to the application server with the found messaging application account as a destination account. The pushing request includes the target application account corresponding to the verification event and the verification information.

Specifically, the pushing request may be sent in a manner of configuring an API (application programming interface) in a related application installed in the first terminal. The first terminal invokes the application programming interface to send a pushing message. The configured application programming interface may be an application programming interface configured by an application server such as an instant messaging application, a payment application, or a social messaging application, in an instant messaging application, a social messaging application, and a payment application installed correspondingly in the first terminal. The first terminal may transmit the generated verification information to the application server by using the application programming interface.

Step 103: After receiving the pushing request sent to the messaging application account, the application server extracts the target application account and the verification information included in the pushing request and pushes the verification information to the target application account.

After receiving the pushing request, the application server extracts the verification information and the target application account from the pushing request according to a coding and decoding format on which the application server agrees with the first terminal, so as to push the verification information to the target application account. Specifically, the application server may send the verification message to the target application account in an existing manner of sending a common message to a certain account.

Step 104: A second terminal that logs in to the target application account receives and displays the verification information.

The second terminal is a terminal with network functions and having related applications installed therein, such as an instant messaging application, a social messaging application, a payment application, and a browser application The terminal may be a personal computer, a notebook computer, a smart phone, a tablet computer, a smart on-board equipment, a wearable smart device, or the like. After the second terminal logs in to the target application account, a user may receive the verification information sent by the application server in step 102.

Figure 2:
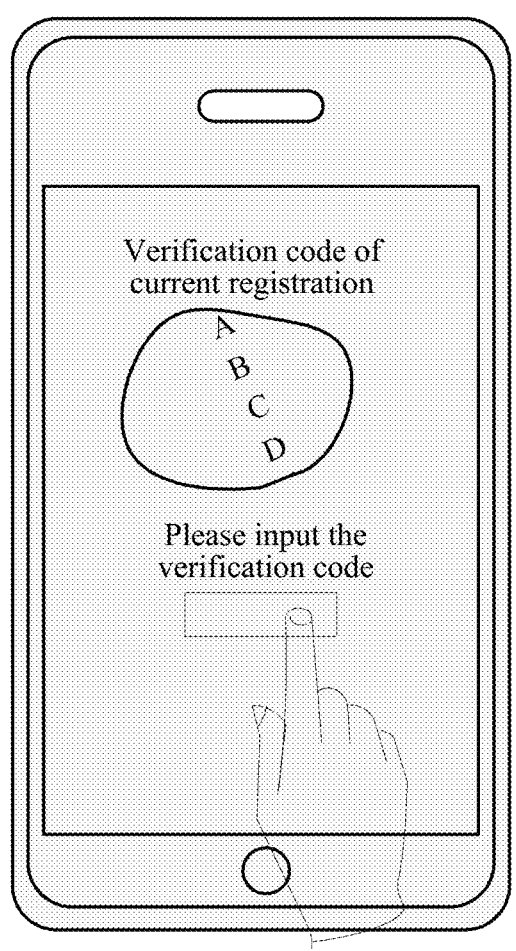
FIG. 2 is a schematic diagram of display of information verification in a terminal according to an embodiment of the present disclosure.

After receiving the verification information, the second terminal may display the verification information in a session display interface in a manner of a service message, or takes a service party application account used by the first terminal when sending the pushing request as a sending party account and displays the verification information in a session interface of the sending party account and the target application account. Specifically, FIG. 2 is a schematic diagram of display of information verification.

After viewing (the character verification information or the picture verification information) or playing and reading the verification information (the audio verification information or the video verification information), a user corresponding to the target application account of the second terminal may perform a subsequent procedure of verifying the verification event in step 101. The method further includes: the second terminal generates, based on the target application account, verification reply information, so as to send the verification reply information to the first terminal, where the verification reply information includes input user verification information; the first terminal receives the verification reply information, verifies the user verification information according to verification information generated for the target application account, and responds to the detected verification event after the verification succeeds. The user verification information in the verification reply information is verification information input manually after the user reads the verification information displayed in the session display interface.

After receiving the verification reply information, the first terminal may perform authentication and verification and respond to the verification event according to the prior art. For example, when characters or numbers in the verification information reply information of the second terminal match with characters or numbers in the verification information obtained in step 101, an account registering request of a user is responded and account registering of the user is completed.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; and to some extent ensuring security of information verification and network security.

Figure 9:
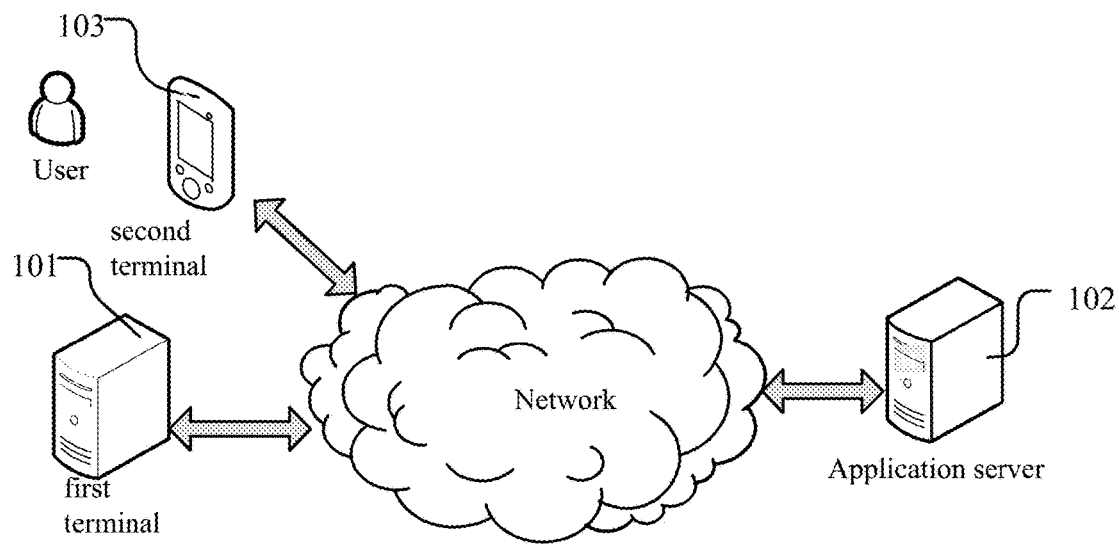
FIG. 9 is a schematic structural diagram of a verification information pushing system according to an embodiment of the present disclosure.
Figure 14:
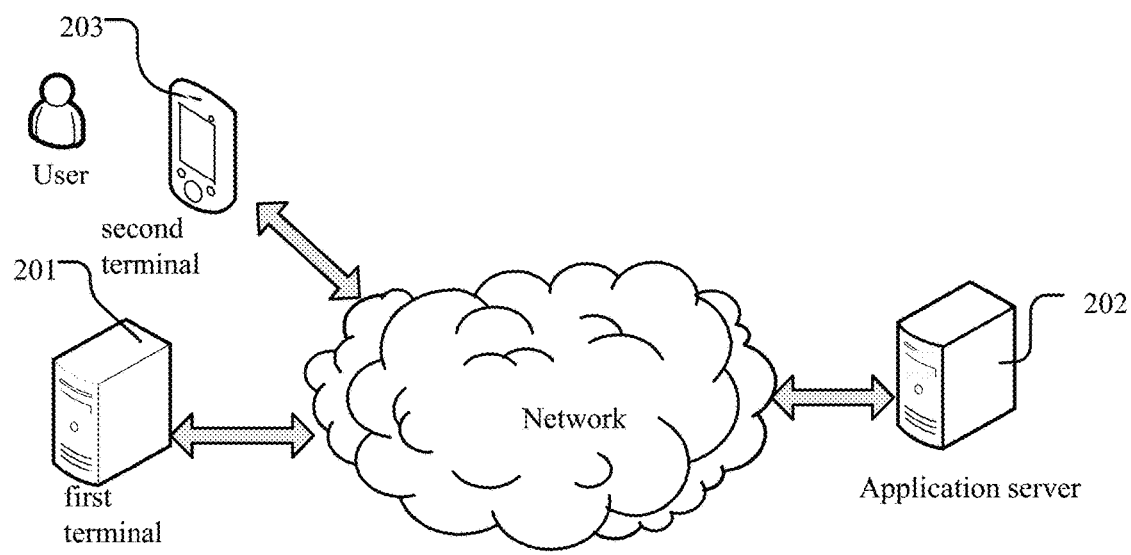
FIG. 14 is a schematic structural diagram of an information verification system according to an embodiment of the present disclosure.

With the development of Internet Of Things (IOT), hundreds of millions of terminals of different types are all connected to the Internet, which serves as the communication channel between different terminals. Besides Internet, the widespread of social networking applications (especially those running on mobile devices) provides a possible platform for people to interact with the terminals and receive services offered by these terminals. In some implementations, the first terminal is a vending machine that sells consumer products ranging from snacks, beverages, alcohol, cigarettes, lottery or transport tickets, and even gold and gems to customers automatically after the customers make payment. The second terminal is a mobile phone that can access the Internet (e.g., a smartphone). As shown in FIGS. 9 and 14, the first terminal and the second terminal are communicatively coupled to a computer server through a network (e.g., the Internet). The computer server is responsible for hosting a social networking application (e.g., an instant messaging application) and providing services to the first and second terminals through their associated accounts of the social networking application.

In some implementations, the first terminal is associated with a first account of the social networking application and the second terminal is associated with a second account of the social networking application. If a user of the second terminal wants to receive service from the first terminal, the first terminal needs to verify the identity of the second terminal. Note that this identity verification protects the first terminal from unwanted attacks such that a terminal that fails the identity verification test cannot receive any service from the second terminal. Moreover, since both terminals are uniquely associated with different accounts of the social networking application, the computer server hosting the social networking application can play a more active role when the first terminal interacts with the second terminal by requiring that no transaction between the two terminals be performed without involving the computer server, which can significantly improve the security of the such transaction.

As described above in connection with FIG. 1, one important step of performing the identity verification from the computer server's perspective is to receive an identity verification request from the first terminal. The identity verification request typically includes information of a verification code and a second account of the social networking application associated with the second terminal that is to be verified. For example, a train station installs a ticket terminal for issuing train tickets, which may be in paper or paperless. In order to communicate with other terminals (e.g., smartphones) through a social networking application, the manufacturer of the ticket terminal may register an account for the ticket terminal at the social networking application. There are at least two potential use scenarios of the ticket terminal's account. First, the manufacturer may be able to use the account to access the ticket terminal to perform system upgrade or debugging remotely by transmitting information from a remote location to the computer server that hosts the social networking application. The computer server then identifies the account associated with the ticket terminal and performs operations accordingly. Second, a customer of the ticket terminal may purchase tickets from the ticket terminal through his/her own account at the social networking application. Using the second scenario as an example, the ticket terminal needs to verify the identity of the customer (i.e., the customer's account at the social networking application). This is especially true if it is the first time that the customer uses the ticket terminal.

In some implementations, the customer (or the user of the second account of the social networking application) first provides the identity of the second account to the ticket terminal by, e.g., sending an email or text message to the ticket terminal. For example, the ticket terminal may display a 2D bar code on its panel, which indicates the first account associated with the ticket terminal. The user can scan the 2D bar code and then sends a message to the first account associated with the ticket terminal from the second account. Upon receipt of the message, the ticket terminal can submit the identity verification request to the computer server. The identity verification request includes a verification code for the user of the second account to confirm.

After receiving the identity verification request from the first terminal, the computer server extracts the verification code from the identity verification request, which maybe in the form of a set of alphanumerical characters. Next, the computer server forwards information of the verification code to the second terminal associated with the second account of the social networking application for verification. In some implementations, the computer server sends the set of alphanumerical characters in its current format to the second terminal. In some other implementations, the computer server generates an audio stream using the set of alphanumerical characters and forwards the audio stream to the second terminal. In some implementations, the audio stream has been encrypted by the computer server according to a set of predefined rules such that only the second terminal associated with the second account can decrypt the audio stream and play it. Note that the audio replay of the verification code may be more secure and convenient for people who have visual disabilities.

As described above in connection with FIG. 2, the user of the second terminal can enter the verification code through a window provided by the social networking application and submits a response to the computer server. Upon receipt of the response, the computer server performs verification of the response using the verification code it receives from the first terminal. After the verification indicates that the user-entered verification code matches the verification code provided by the first terminal, the computer server establishes a relationship between the first account and the second account such that the second terminal can interact with the first terminal through the social networking application and receive the services provided by the first terminal (e.g., purchasing train tickets).

In some implementations, the first terminal may keep the verification code confidential to the computer server such that the verification of the response from the second terminal is handled by the first terminal. In this case, the computer server simply sends the response to the first terminal. The first terminal then extracts the user-entered verification code from the response and performs verification accordingly. At the end of the verification process, the first terminal returns a verification result (positive or negative) to the second computer server. As described in detail below in connection with FIG. 3, before the verification process, the first terminal may need to seek authorization from the computer server to do the verification. This is partly because that the first account associated with the first terminal is a specialized account of the social networking application that provides some service to other accounts of the social networking application. To do so, the first terminal sends an authorization request to the computer server, which includes information of the first account. Upon receipt of the authorization request, the computer server determines whether this first account is qualified for conducting such verification and providing services to other accounts. For example, the computer server may only provide an account with such a special authorization if there is a prior agreement between the manufacturer of the first terminal (e.g., the ticket terminal) and the party running the social networking application on the computer server.

If the first account is deemed to be qualified for providing such service, the computer server then defines a data structure in its memory for hosting the relationships between the first account and other accounts of the social networking application. In some implementations, the computer server also designates a particular API for the first terminal to transmit the identity verification request. Subsequently, after the verification of the second account using the verification code, the computer server generates a new entry in the data structure. the entry includes the information of the first and second accounts.

After the verification is completed, the first terminal can render services to the second terminal in response to a service request. Assuming that the service request is from the second terminal, the service request may include information of a service code (e.g., the train number that the user of the second terminal is planning to take) and the two accounts. In response, the computer server queries the data structure for an entry corresponding to the service request (e.g., an entry including identities of the first and second accounts or the equivalent). After locating the entry, the computer server determines that the second terminal has already been verified as being allowed to receive service from the first terminal. In light of so, the computer server then sends the service code to the first terminal to render the service according to the service code (e.g., issuing a paper or electronic ticket). If the computer server fails to find the entry, the computer server then denies the service request. In some implementations, the computer server also determines an amount of fee charge before sending the service code to the first terminal and deducts the amount from a bank account associated with the second account (sometimes, the bank account itself may be the second account). After the first terminal renders the service, it may send a service completion message to the computer server, which then forwards the message to the second terminal.

In some other embodiments, the service request is from the first terminal. For example, the user of the second terminal may provide information of the second account to the first terminal. Likewise, the computer queries the data structure for a corresponding entry and sends a confirmation request to the second terminal after identifying the entry in the data structure. Next, the computer server receives a confirmation response from the second terminal. In some implementations, the confirmation response includes an authorization from the user to deduct a corresponding amount of fee from the user's bank account associated with the second account. After that, the computer server sends a service instruction to the first terminal to provide the user-ordered service.

Figure 3:
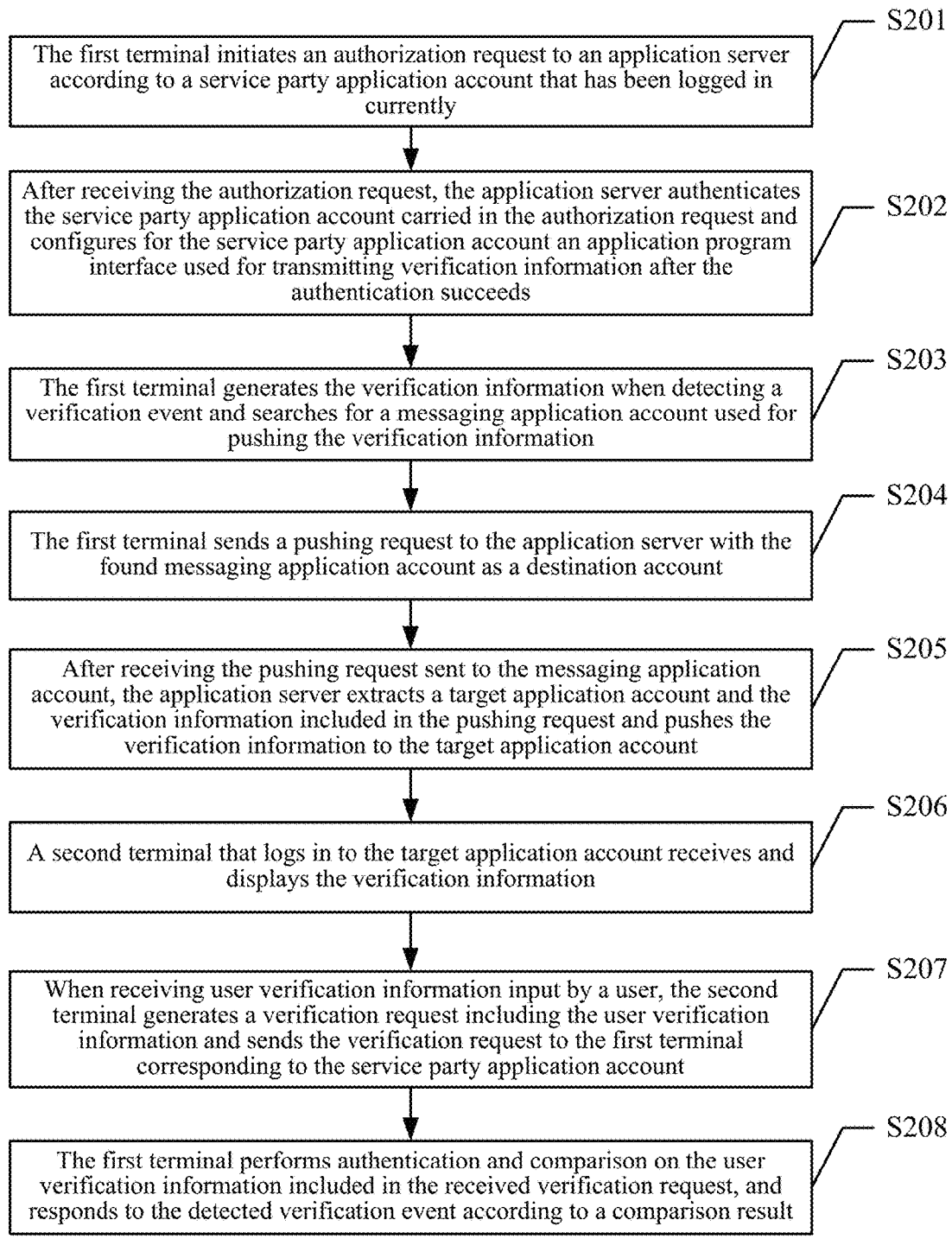
FIG. 3 is a schematic flowchart of another verification information pushing method according to an embodiment of the present disclosure.

FIG. 3 is a schematic flowchart of another verification information pushing method according to an embodiment of the present disclosure. The method in the embodiment of the present disclosure may be implemented between application servers, such as an instant messaging application and a social messaging application, and all types of service provider devices and smart user terminals. Specifically, the method includes:

Step 201: The first terminal initiates an authorization request to an application server according to a service party application account that has been logged in currently. The authorization request is used to request the application server to configure an application programming interface used for transmitting verification information.

Step 202: After receiving the authorization request, the application server authenticates the service party application account carried in the authorization request and configures for the service party application account the application programming interface used for transmitting the verification information after the authentication succeeds.

In step 201 and step 202, a service provider obtains authorization given by the application server for a verification information pushing function, the application server provides a corresponding application programming interface, and the first terminal adds a corresponding function button in an installed application, so that a service providing user pushes the verification information by clicking the button after obtaining the verification information.

Step 203: The first terminal generates the verification information when detecting a verification event and searches for a messaging application account used for pushing the verification information. The obtained verification information includes one or more of character verification information, picture verification information, audio verification information, and video verification information that are randomly generated.

Step 204: The first terminal sends the pushing request to the application server with the found messaging application account as a destination account. The pushing request includes the target application account corresponding to the verification event and the verification information.

A format used for generating the pushing request may be a format that is negotiated by the first terminal and the application server. Based on the negotiated format, encapsulation and generation are completed at the first terminal, and decapsulation may be completed at the application server.

The messaging application account used for pushing the verification information may be a preset public account, and a user that obtains pushing authorization of the verification information may send, based on an account of the user, the pushing request including the target application account and the verification information to the messaging application account used for pushing the verification information.

Step 205: After receiving the pushing request sent to the messaging application account, the application server extracts the target application account and the verification information included in the pushing request and pushes the verification information to the target application account.

In the embodiment of the present disclosure, after receiving the pushing request sent to the messaging application account used for pushing the verification information, the server may first perform authentication and verification on an account that initiates the pushing request, namely, the service party application account; performs step 206 after the verification succeeds; and otherwise, ends the operation, or sends prompt information to the first terminal according to the service party application account, so as to prompt that the authorization is not obtained.

Step 206: A second terminal that logs in to the target application account receives and displays the verification information.

Reference may be made to description of related steps in the embodiment corresponding to FIG. 1 for a specific implementation of step 205 and step 206.

Step 207: When receiving user verification information input by a user, the second terminal generates a verification request including the user verification information and sends the verification request to the first terminal corresponding to the service party application account.

A corresponding user performs a related operation on the verification information displayed in a session display interface in step 206, obtains specific content of the verification information, and then may switch to a corresponding verification information input box in a related account registering page, a service or commodity purchase determining page, or a downloading or message sending page, so as to input the verification information to obtain verification information reply information. After obtaining the verification information reply information, the second terminal may send, based on an existing sending manner, the verification information reply information to the first terminal of the service providing user, so as to complete user verification.

Step 208: The first terminal performs authentication and comparison on the user verification information included in the received verification request, and responds to the detected verification event according to a comparison result.

After receiving the verification information reply information, the first terminal may perform authentication and verification and respond to the verification event according to the prior art. For example, when characters or numbers in the verification information reply information of the second terminal match with characters or numbers in the verification information obtained in step 203, an account registering request of a user is responded and account registering of the user is completed.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; and to some extent ensuring security of information verification and network security.

Figure 4:
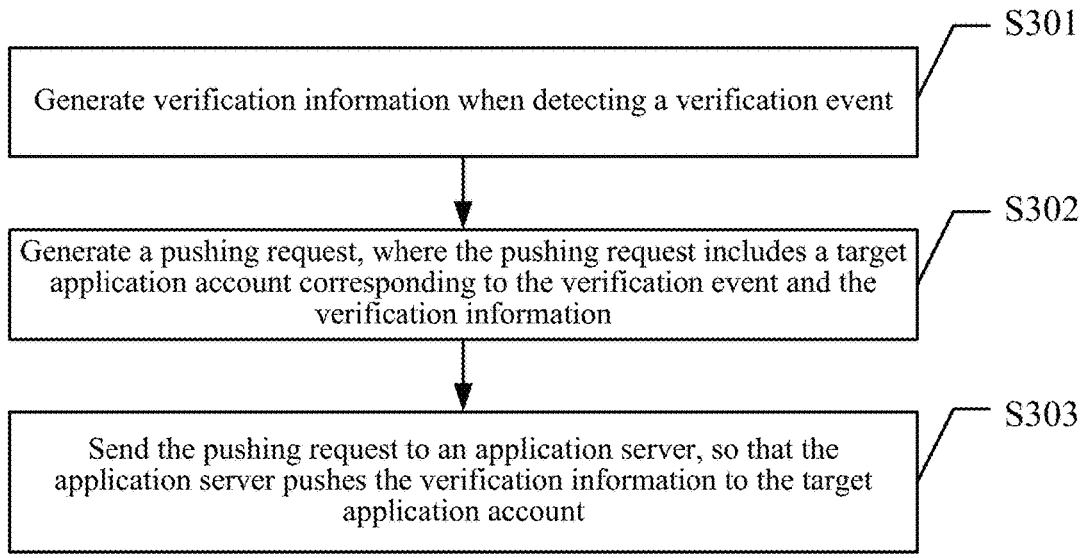
FIG. 4 is a schematic flowchart of another verification information pushing method according to an embodiment of the present disclosure.

FIG. 4 is a schematic flowchart of another verification information pushing method according to an embodiment of the present disclosure. The method in the embodiment of the present disclosure may be applied to a service provider device used by a service providing user that provides related services. The service provider device may include a personal computer, a notebook computer, and even a server. Specifically, the method includes:

Step 301: Generate verification information when detecting a verification event.

The detecting a verification event includes: detecting an account registering event of a user, detecting a service or commodity purchase event of a user, and detecting a downloading or message sending event, or other user operating events that need sending verification information to verify the user. After the verification event is detected, a group of verification information including characters, numbers, or a combination of characters and numbers may be randomly generated. The verification information may specifically include one or more of character verification information, picture verification information, audio verification information, and video verification information.

Step 302: Generate a pushing request, where the pushing request includes a target application account corresponding to the verification event and the verification information.

The generated verification information may be transferred to an application server by using an application programming interface in an installed instant messaging application, social messaging application, or payment application.

The destination application account is a user account indicated by the verification event. Specifically, for example, when the verification event is the account registering event of the user, the destination application account may be a user contact account, such as an instant messaging account or a social messaging application account bound to the user as specified during registration.

Step 303: Send the pushing request to the application server, so that the application server pushes the verification information to the target application account.

The step 303 may specifically include: searching for a messaging application account used for pushing the verification information, invoking a configured application programming interface, and sending the pushing request to the application server with the found messaging application account as a destination account.

A format used for the pushing request may be a format that is negotiated by a first terminal and the application server. Based on the negotiated format, encapsulation is completed in the first terminal, and decapsulation may be completed in the application server.

The messaging application account used for pushing the verification information may be a preset public account, and a user that obtains pushing authorization of the verification information may send, based on an account of the user, the pushing request including the target application account and the verification information to the messaging application account used for pushing the verification information.

In addition, if verification relay information returned according to the pushing request is received, authentication and comparison are performed on verification information included in the received verification information relay information, and the detected verification event is responded according to a comparison result.

After the verification information relay information is received, authentication and verification may be performed and the verification event may be responded according to the prior art. For example, when characters or numbers in the verification information reply information match with characters or numbers in the verification information obtained in step 301, an account registering request of a user is responded and account registering of the user is completed.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; and to some extent ensuring security of information verification and network security.

Figure 5:
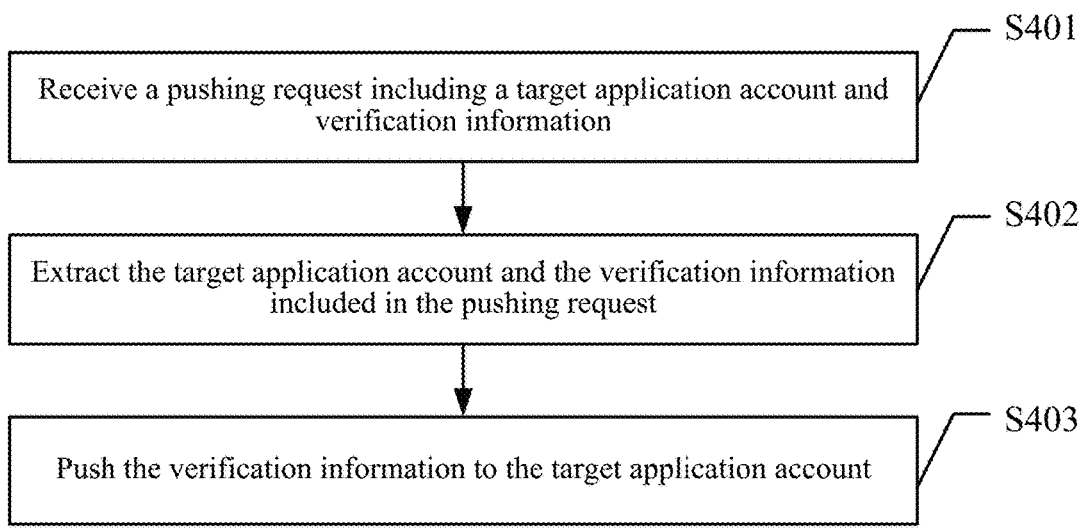
FIG. 5 is a schematic flowchart of another verification information pushing method according to an embodiment of the present disclosure.

FIG. 5 is a schematic flowchart of another verification information pushing method according to an embodiment of the present disclosure. The method in the embodiment of the present disclosure may be applied to an application server having applications installed therein, such as an instant messaging application, a social messaging application, a payment application, and a browser application. Specifically, the method in the embodiment of the present disclosure includes:

Step 401: Receive a pushing request including a target application account and the verification information.

The pushing request is generated and sent by a related service provider device when a verification event is detected, and reference may be made to the foregoing embodiments for a specific generating and sending process of the pushing request.

Step 402: Extract the target application account and the verification information included in the pushing request.

A format used by the pushing request may be a negotiated format; and based on the negotiated format, decapsulation and content extraction may be completed at the application server.

The pushing request may be a message sent to a specified messaging application account, the specified messaging application account may be a preset public account used for pushing the verification information, and a user that obtains pushing authorization of the verification information may send, based on an account of the user, the pushing request including the target application account and the verification information to the messaging application account used for pushing the verification information.

Step 403: Push the verification information to the target application account.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; and to some extent ensuring security of information verification and network security.

Figure 6:
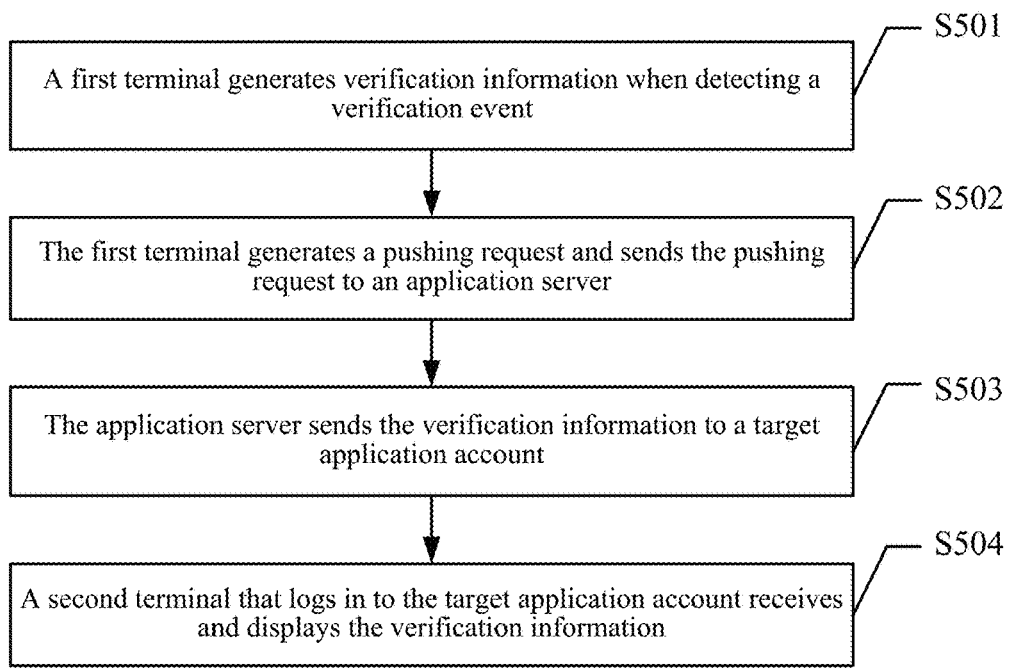
FIG. 6 is a schematic flowchart of another verification information pushing method according to an embodiment of the present disclosure.

FIG. 6 is a schematic flowchart of another verification information pushing method according to an embodiment of the present disclosure. The method in the embodiment of the present disclosure may be implemented between application servers, such as an instant messaging application and a social messaging application, and all types of service provider devices and smart user terminals. Specifically, the method includes:

Step 501: A first terminal generates verification information when detecting a verification event.

The first terminal is a service provider device, and may include a personal computer, a notebook computer, and even a server used by a service providing user that provides related services. The detecting a verification event includes: detecting an account registering event of a user, detecting a service or commodity purchase event of a user, and detecting a downloading or message sending event, or other user operating events that need sending verification information to verify the user.

After detecting the verification event, the first terminal may randomly generate a group of verification information including characters, numbers, or a combination of characters and numbers. The verification information may specifically include one or more of character verification information, picture verification information, audio verification information, and video verification information.

Step 502: The first terminal generates a pushing request and sends the pushing request to an application server. The pushing request includes a target application account corresponding to the verification event and the verification information.

The step of the first terminal generating a pushing request and sending the pushing request to an application server includes: the first terminal searching for a messaging application account used for pushing the verification information, and the first terminal sending the pushing request to the application server with the found messaging application account as a destination account.

Step 503: The application server sends the verification information to the target application account.

After receiving the transferred pushing request, the application server extracts the target application account and the verification information from the pushing request according to a coding and decoding format on which the application server agrees with the first terminal, so as to push the verification information to the target application account. Specifically, the application server may send the verification message to the target application account in an existing manner of sending a common message to a certain account.

Step 504: A second terminal that logs in to the target application account receives and displays the verification information.

The second terminal is a terminal with network functions and having related applications installed therein, such as an instant messaging application, a social messaging application, a payment application, and a browser application. The terminal may be a personal computer, a notebook computer, a smart phone, a tablet computer, on-board smart equipment, a wearable smart device, or the like. After the second terminal logs in to the target application account, a user may receive the verification information sent by the application server in step 102.

After receiving the verification information, the second terminal may display the verification information in a session display interface in a manner of a service message, or takes a service party application account used by the first terminal when sending the pushing request as a sending party account and displays the verification information in a session interface of the sending party account and the target application account.

Specifically, reference may be made to description of the embodiments corresponding to FIG. 1 to FIG. 5 for a specific implementation of the first terminal, the second terminal, and the application server in the embodiment of the present disclosure.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; and to some extent ensuring security of information verification and network security.

Figure 7:
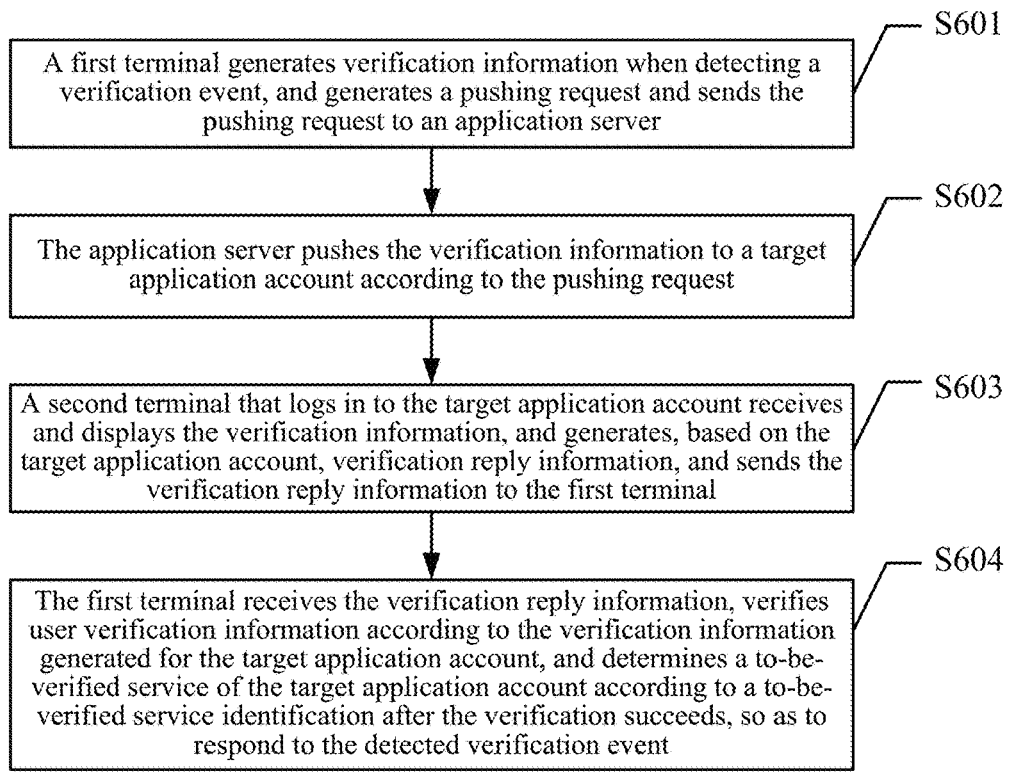
FIG. 7 is a schematic flowchart of an information verification method according to an embodiment of the present disclosure.

FIG. 7 is a schematic flowchart of an information verification method according to an embodiment of the present disclosure. The method in the embodiment of the present disclosure may be implemented between application servers, such as an instant messaging application and a social messaging application; and all types of service provider devices and smart user terminals. Specifically, the method includes:

Step 601: A first terminal generates verification information when detecting a verification event, and generates a pushing request and sends the pushing request to an application server. The pushing request includes a target application account and the verification information.

The step of a first terminal generating a pushing request and sending the pushing request to an application server includes: the first terminal searching for a messaging application account used for pushing the verification information and sending the pushing request to the application server with the found messaging application account as a destination account.

Step 602: The application server pushes the verification information to the target application account according to the pushing request.

Specifically, Reference may be made to description of the embodiments corresponding to FIG. 1 to FIG. 6 for a specific implementation of step 601 and step 602.

Step 603: A second terminal that logs in to the target application account receives and displays the verification information; and generates, based on the target application account, verification reply information, and sends the verification reply information to the first terminal. The verification reply information includes a corresponding to-be-verified service identification used for indicating the verification event and user verification information that are input.

Reference may be made to description of the embodiments corresponding to FIG. 1 to FIG. 6 for a specific implementation of a second terminal receiving and displaying the verification information.

After obtaining the verification information, a user may manually input, in the second terminal, the verification information and the to-be-verified service identification to send the verification reply information to the first terminal. The to-be-verified service identification indicates a specific to-be-verified service by using a specified letter abbreviation or number, for example, for a certain instant messaging registering service, an abbreviation of a name of the instant messaging application may be carried to serve as a to-be-verified service identification. Correspondence between to-be-verified service identifications and services is indicated by presetting a negotiating table.

Step 604: The first terminal receives the verification reply information, verifies the user verification information according to verification information generated for the target application account, and determines a to-be-verified service of the target application account according to the to-be-verified service identification after the verification succeeds, so as to respond to the detected verification event.

After receiving the verification reply information, the first terminal searches, according to a user account that sends the verification reply information, for latest verification information generated for the user account, and compares one by one the verification information with the user verification information in the verification reply information. If consistent, the verification succeeds. The first terminal determines a to-be-verified service of the target application account according to the to-be-verified service identification; and finally responds to the verification event detected in step 601, so as to complete services, such as account registering and downloading.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; ensuring verification accuracy; and to some extent ensuring security of information verification and network security.

Figure 8:
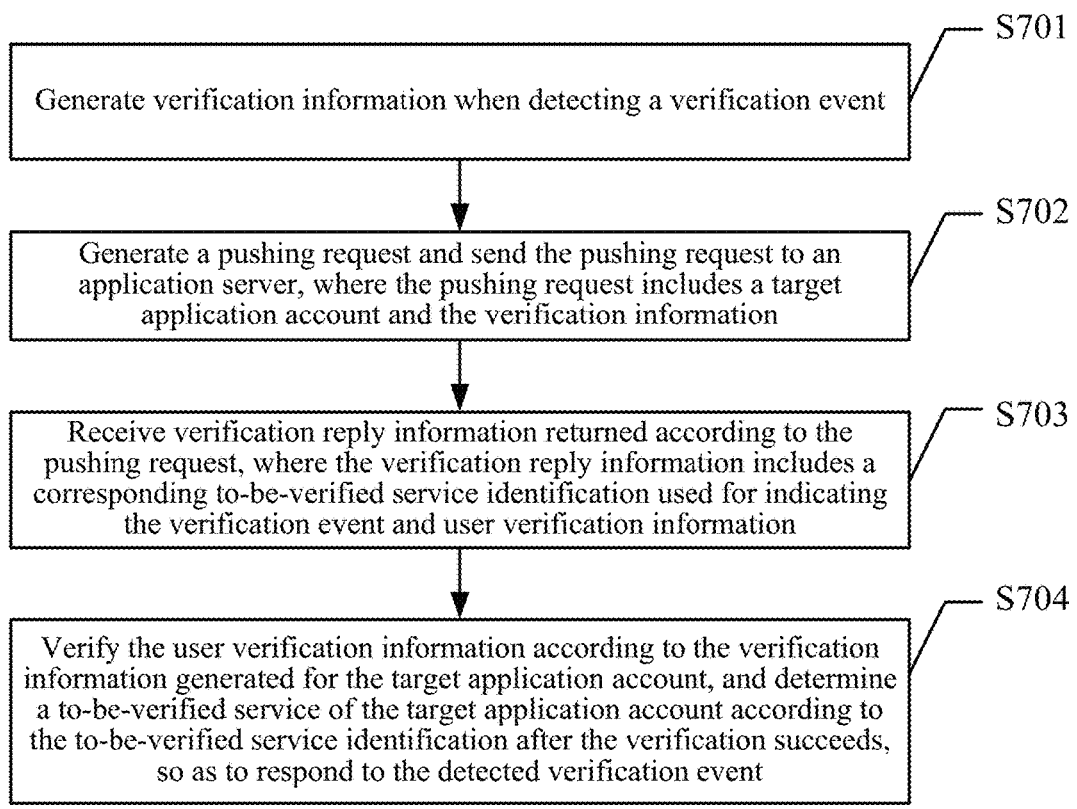
FIG. 8 is a schematic flowchart of another information verification method according to an embodiment of the present disclosure.

FIG. 8 is a schematic flowchart of another information verification method according to an embodiment of the present disclosure. The method in the embodiment of the present disclosure may be applied to a service provider device used by a service providing user that provides related services. The service provider device may include a personal computer, a notebook computer, and even a server. The method includes:

Step 701: Generate verification information when detecting a verification event.

Step 702: Generate a pushing request and send the pushing request to an application server, where the pushing request includes a target application account and the verification information.

Reference may be made to description of the embodiments corresponding to FIG. 1 to FIG. 6 for a specific implementation of step 701 and step 702.

Step 703: Receive verification reply information returned according to the pushing request, where the verification reply information includes a corresponding to-be-verified service identification used for indicating the verification event and user verification information.

In a client that receives the verification information, a user may manually input the verification information and the to-be-verified service identification to return the verification reply information. The to-be-verified service identification indicates a specific to-be-verified service by using a specified letter abbreviation or number, for example, for a certain instant messaging registering service, an abbreviation of a name of the instant messaging application may be carried to serve as to-be-verified service identification. Correspondence between to-be-verified service identifications and services is indicated by presetting a negotiating table.

Step 704: Verify the user verification information according to verification information generated for the target application account, and determine a to-be-verified service of the target application account according to the to-be-verified service identification after the verification succeeds, so as to respond to the detected verification event.

After the verification reply information is received, according to a user account that sends the verification reply information, latest verification information generated for the user account is searched for, the found verification information and the user verification information in the verification reply information are compared one by one; if consistent, the verification succeeds; a to-be-verified service of the target application account is determined according to the to-be-verified service identification; and finally the verification event detected in step 601 is responded to, so as to complete services, such as account registering and downloading.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; ensuring verification accuracy; and to some extent ensuring security of information verification and network security.

A verification information pushing apparatus and system in embodiments of the present disclosure are described in detail in the following.

FIG. 9 is a schematic structural diagram of a verification information pushing system according to an embodiment of the present disclosure. The system in the embodiment of the present disclosure includes: a first terminal 101, an application server 102, and a second terminal 103. The first terminal 101 may be a service provider device and includes a personal computer, a notebook computer, and even a server used by a service providing user that provides related services. The application server 102 may be an application server, such as an instant messaging application, or a social messaging application. The second terminal 103 may be a terminal with network functions and having related applications installed therein, such as an instant messaging application, a social messaging application, a payment application, and a browser application. The terminal may be a personal computer, a notebook computer, a smart phone, a tablet computer, an on-board smart equipment, a wearable smart device, or the like.

The first terminal 101 is configured to generate verification information when detecting a verification event, search for a messaging application account used for pushing the verification information, and send the pushing request to the application server 102 with the found messaging application account as a destination account. The pushing request includes a target application account corresponding to the verification event and the verification information.

The application server 102 is configured to: after receiving the pushing request sent to the messaging application account, extract the verification information and the target application account included in the pushing request and push the verification information to the target application account.

The second terminal 103 that logs in to the target application account is configured to receive and display the verification information.

The first terminal 101 is a service provider device, and may include a personal computer, a notebook computer, and even a server used by a service providing user that provides related services. The detecting a verification event includes: detecting an account registering event of a user, detecting a service or commodity purchase event of a user, and detecting a downloading or message sending event, or other user operating events that need sending verification information to verify the user.

After detecting the verification event, the first terminal 101 may randomly generate a group of verification information including characters, numbers, or a combination of characters and numbers. The verification information may specifically include one or more of character verification information, picture verification information, audio verification information, and video verification information.

The destination application account is a user account indicated by the verification event. Specifically, for example, when the verification event is the account registering event of the user, the destination application account may be a user contact account, such as an instant messaging account or a social messaging application account bound to the user as specified during registration.

Specifically, the pushing request may be sent in a manner of configuring an application programming interface in a related application installed in the first terminal 101. The first terminal invokes the application programming interface to send a pushing message.

After receiving the pushing request, the application server 102 extracts the target application account and the verification information from the pushing request according to a coding and decoding format on which the application server 102 agrees with the first terminal 101, so as to push the verification information to the target application account. Specifically, the application server 102 may send the verification message to the target application account in an existing manner of sending a common message to a certain account.

The second terminal 103 is a terminal with network functions and having related applications installed therein, such as an instant messaging application, a social messaging application, a payment application, and a browser application. The terminal may be a personal computer, a notebook computer, a smart phone, a tablet computer, an on-board smart equipment, a wearable smart device, or the like. After the second terminal 103 logs in to the target application account, a user may receive the verification information sent by the application server 102.

After receiving the verification information, the second terminal 103 may display the verification information in a session display interface in a manner of a service message, or takes a service party application account used by the first terminal 101 when sending a pushing message as a sending party account and displays the verification information in a session interface of the sending party account and the target application account.

After viewing (the character verification information or the picture verification information) or playing and reading the verification information (the audio verification information or the video verification information), a user corresponding to the target application account of the second terminal 103 may perform a subsequent procedure of verifying the verification event.

Reference may be made to the prior art for an implementation of a process during which the first terminal 101 performs authentication and verification and responds to the verification event after receiving the verification information relay information. For example, when characters or numbers in the verification information reply information of the second terminal 103 match with characters or numbers in the obtained verification information, an account registering request of a user is responded and account registering of the user is completed.

Further, optionally, the first terminal 101 is further configured to initiate, according to a service party application account that has been logged in currently, an authorization request to an application server 102. The authorization request is used to request the application server 102 to configure an application programming interface used for transmitting verification information.

The application server 102 is further configured to: after receiving the authorization request, authenticate the service party application account carried in the authorization request and configure for the service party application account the application programming interface used for transmitting the verification information after the authentication succeeds.

Further, optionally, the application server 102 is further configured to perform authentication on the service party application account that initiates the pushing request.

Further, optionally, the second terminal 103 is further configured to: when receiving user verification information input by a user, generate a verification request including the user verification information and send the verification request to the first terminal 101 corresponding to the service party application account.

The first terminal 101 is further configured to perform authentication and comparison on the user verification information included in the received verification request, and respond to the detected verification event according to a comparison result.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; and to some extent ensuring security of information verification and network security.

Figure 10:
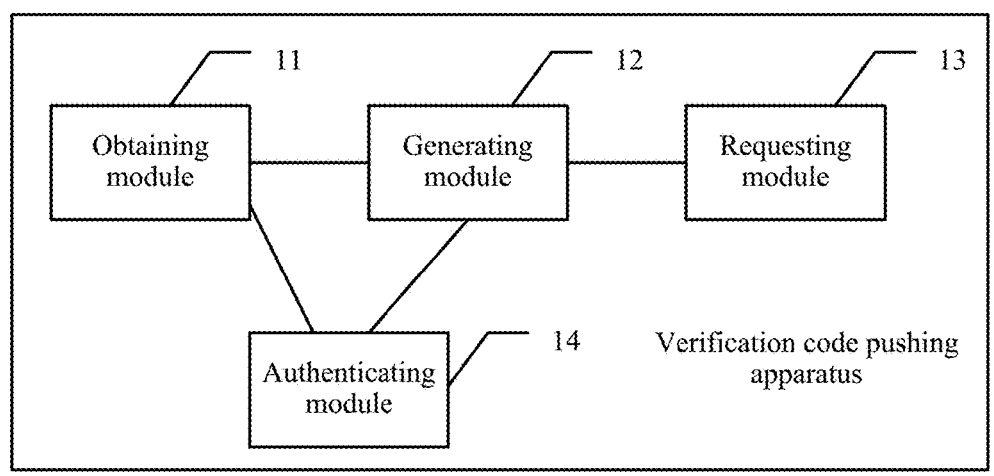
FIG. 10 is a schematic structural diagram of a verification information pushing apparatus according to an embodiment of the present disclosure.

FIG. 10 is a schematic structural diagram of a verification information pushing apparatus according to an embodiment of the present disclosure. The apparatus in the embodiment of the present disclosure may be arranged in a service provider device used by a service providing user that provides related services. The service provider device may include a personal computer, a notebook computer, and even a server. The apparatus includes:

an obtaining module 11, configured to generate verification information when detecting a verification event;

a generating module 12, configured to generate a pushing request, where the pushing request includes a target application account corresponding to the verification event and the verification information; and a requesting module 13, configured to send the pushing request to an application server, so that the application server pushes the verification information to the target application account.

The detecting a verification event includes: detecting an account registering event of a user, detecting a service or commodity purchase event of a user, and detecting a downloading or message sending event, or other user operating events that need sending verification information to verify the user. After detecting the verification event, the obtaining module 11 may randomly generate a group of verification information including characters, numbers, or a combination of characters and numbers. The verification information may specifically include one or more of character verification information, picture verification information, audio verification information, and video verification information.

The destination application account is a user account indicated by the verification event. Specifically, for example, when the verification event is the account registering event of the user, the destination application account may be a user contact account, such as an instant messaging account or a social messaging application account bound to the user as specified during registration.

Specifically, optionally, the requesting module 13 is specifically configured to search for a messaging application account used for pushing the verification information, invoke a configured application programming interface, and send the pushing request to the application server with the found messaging application account as a destination account.

A format used for the pushing request may be a format that is negotiated by a client and a server. Based on the negotiated format, encapsulation is completed by the generating module 12, and decapsulation may be completed in the server.

The messaging application account used for pushing the verification information may be a preset public account, and a user that obtains pushing authorization of the verification information may send, based on an account of the user, the pushing request including the target application account and the verification information to the messaging application account used for pushing the verification information.

Further, the apparatus in the embodiment of the present disclosure may further include: an authenticating module 14, configured to: when verification relay information returned according to the pushing request is received, perform authentication and comparison on verification information included in the received verification information relay information, and respond to the detected verification event according to a comparison result. Reference may be made to the prior art for an implementation of a process during which authentication and verification are performed, and the verification event is responded to after the verification information reply information is received. For example, when characters or numbers in the verification information reply information match with characters or numbers in the verification information obtained by the obtaining module 11, an account registering request of a user is responded and account registering of the user is completed.

Figure 11:
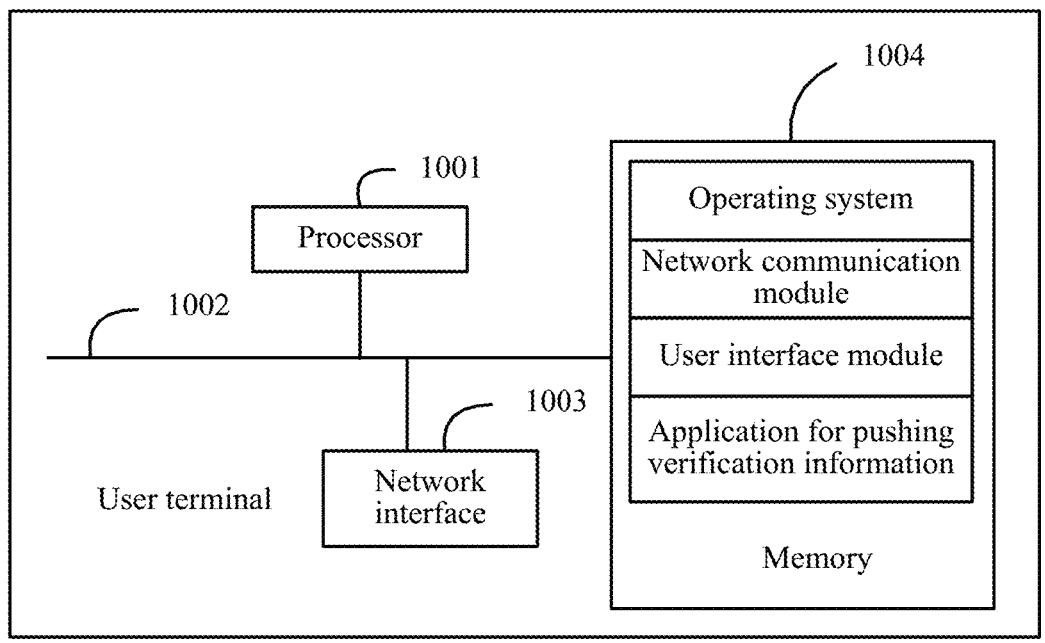
FIG. 11 is a schematic structural diagram of a user terminal according to an embodiment of the present disclosure.

Further, FIG. 11 is a schematic structural diagram of a user terminal according to an embodiment of the present disclosure. The user terminal according to the embodiment of the present disclosure includes: at least one processor 1001, for example a CPU, at least one communications bus 1002, at least one network interface 1003, and a memory 1004. The communications bus 1002 is configured to realize connection and communication between these components. Optionally, the network interface 1003 may include a standard wired interface, and a standard wireless interface (for example, a Wi-Fi interface or a mobile communication interface). The memory 1004 may be a high-speed RAM memory, and may also be an NVM (non-volatile memory), for example, at least one disk memory. Optionally, the memory 1004 may further be at least one memory apparatus far away from the processor 1001. As shown in FIG. 11, the memory 1004, as a computer storage medium, stores an operating system and a network communication module; and further stores an application program for pushing verification information, and the like.

Specifically, the processor 1001 may be configured to invoke the application program for pushing verification information stored in the memory 1004 to perform the following steps:

generating verification information when detecting a verification event;

generating a pushing request, where the pushing request includes a target application account corresponding to the verification event and the verification information; and sending the pushing request to the application server, so that the application server pushes the verification information to the target application account.

When sending the pushing request to the application server, so that the application server pushes the verification information to the target application account, the processor 1001 specifically performs the following steps:

searching for a messaging application account used for pushing the verification information, invoking a configured application programming interface, and sending the pushing request to the application server with the found messaging application account as a destination account.

The processor 1001 further performs the following steps:

If verification relay information returned according to the pushing request is received, performing authentication and comparison on verification information included in the received verification information relay information, and responding to the detected verification event according to a comparison result.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; and to some extent ensuring security of information verification and network security.

Figure 12:
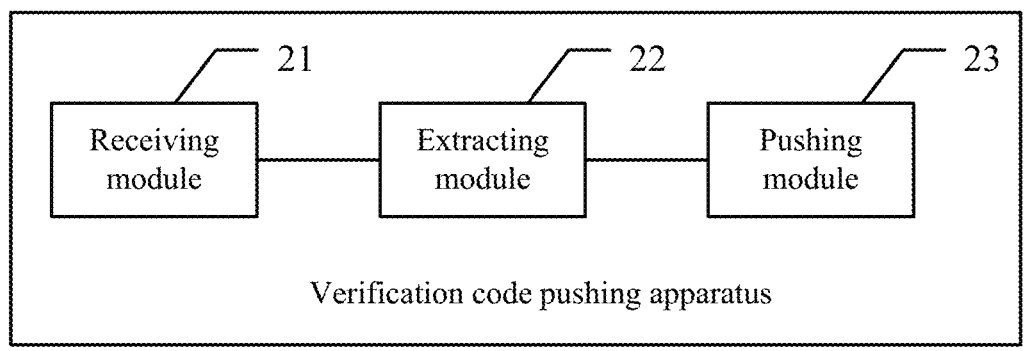
FIG. 12 is a schematic structural diagram of another verification information pushing apparatus according to an embodiment of the present disclosure.

FIG. 12 is a schematic structural diagram of another verification information pushing apparatus according to an embodiment of the present disclosure. The apparatus in the embodiment of the present disclosure may be arranged in an application server having applications installed therein, such as an instant messaging application, a social messaging application, a payment application, and a browser application. Specifically, the apparatus in the embodiment of the present disclosure includes:

a receiving module 21, configured to receive a pushing request including a target application account and verification information;

an extracting module 22, configured to extract the target application account and the verification information included in the pushing request; and a pushing module 23, configured to push the verification information to the target application account.

The pushing request received by the receiving module 21 is generated and sent by a related service provider device when a verification event is detected, and reference may be made to the foregoing embodiments for a specific generating and sending process of the pushing request.

A format used by the pushing request may be a negotiated format; and based on the negotiated format, the extracting module 22 may complete decapsulation and content extraction.

The messaging application account used for pushing the verification information may be a preset public account, and a user that obtains pushing authorization of the verification information may send, based on an account of the user, the pushing request including the target application account and the verification information to the messaging application account used for pushing the verification information.

Figure 13:
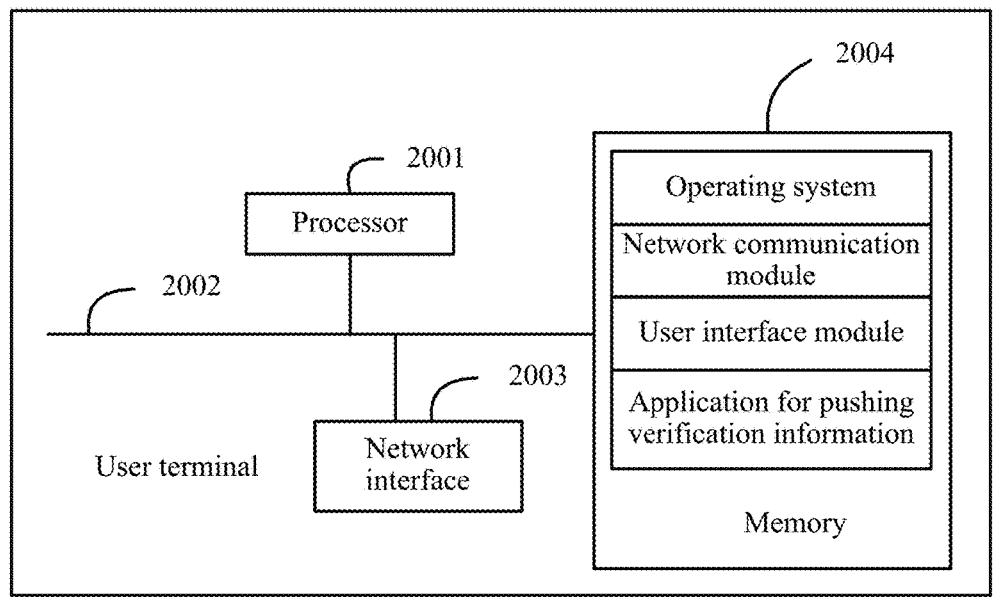
FIG. 13 is a schematic structural diagram of a server according to an embodiment of the present disclosure.

Further, FIG. 13 is a schematic structural diagram of a server according to an embodiment of the present disclosure. The server according to the embodiment of the present disclosure includes: at least one processor 2001, for example a CPU, at least one communications bus 2002, at least one network interface 2003, and a memory 2004. The communications bus 2002 is configured to realize connection and communication between these components. Optionally, the network interface 2003 may include a standard wired interface, and a standard wireless interface (for example, a Wi-Fi interface or a mobile communication interface). The memory 2004 may be a high-speed RAM memory, and may also be a NVM (non-volatile memory), for example, at least one disk memory. Optionally, the memory 2004 may further be at least one memory apparatus far away from the processor 2001. As shown in FIG. 13, the memory 2004, as a computer storage medium, stores an operating system and a network communication module; and further stores an application for pushing verification information, and the like.

Specifically, the processor 2001 may be configured to invoke the application for pushing verification information stored in the memory 2004 to perform the following steps:

receiving a pushing request including a target application account and verification information;

extracting the target application account and the verification information included in the pushing request; and pushing the verification information to the target application account.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; and to some extent ensuring security of information verification and network security.

In the embodiment of the present disclosure, a generated verification code is sent to a corresponding application server by using an application programming interface, and the application server sends, based on an application account, the verification code to a related terminal; thereby implementing pushing of a verification code in a current application scenario, such as an instant messaging application, or a social messaging application; and to some extent ensuring security of the information code and network security.

FIG. 14 is a schematic structural diagram of an information verification system according to an embodiment of the present disclosure. The system in the embodiment of the present disclosure includes: a first terminal 201, an application server 202, and a second terminal 203.

The first terminal 201 is configured to generate verification information when detecting a verification event, and generate a pushing request and send the pushing request to the application server 202. The pushing request includes a target application account and the verification information.

The application server 202 is configured to push the verification information to the target application account according to the pushing request.

The second terminal 203 that logs in to the target application account is configured to receive and display the verification information; and generate, based on the target application account, verification reply information, and send the verification reply information to the first terminal 201. The verification reply information includes a corresponding to-be-verified service identification used for indicating the verification event and user verification information that are input.

The first terminal 201 is further configured to receive the verification reply information, verify the user verification information according to verification information generated for the target application account, and determine a to-be-verified service of the target application account according to the to-be-verified service identification after the verification succeeds, so as to respond to the detected verification event.

Reference may be made to description of the foregoing embodiments for a process in which the first terminal 201, the second terminal 203, and the application server 202 complete pushing and receiving of the verification information.

After obtaining the verification information, a user may manually input, in the second terminal, the verification information and the to-be-verified service identification to send the verification reply information to the first terminal. The to-be-verified service identification indicates a specific to-be-verified service by using a specified letter abbreviation or number, for example, for a certain instant messaging registering service, an abbreviation of a name of the instant messaging application may be carried to serve as a to-be-verified service identification. Correspondence between to-be-verified service identifications and services is indicated by presetting a negotiating table.

After receiving the verification reply information, the first terminal 201 searches, according to a user account that sends the verification reply information, for latest verification information generated for the user account, and compares one by one the verification information with the user verification information in the verification reply information. If consistent, the verification succeeds. The first terminal 201 determines a to-be-verified service of the target application account according to the to-be-verified service identification; and finally responds to the verification event detected in step 601, so as to complete services, such as account registering and downloading.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; ensuring verification accuracy; and to some extent ensuring security of information verification and network security.

Figure 15:
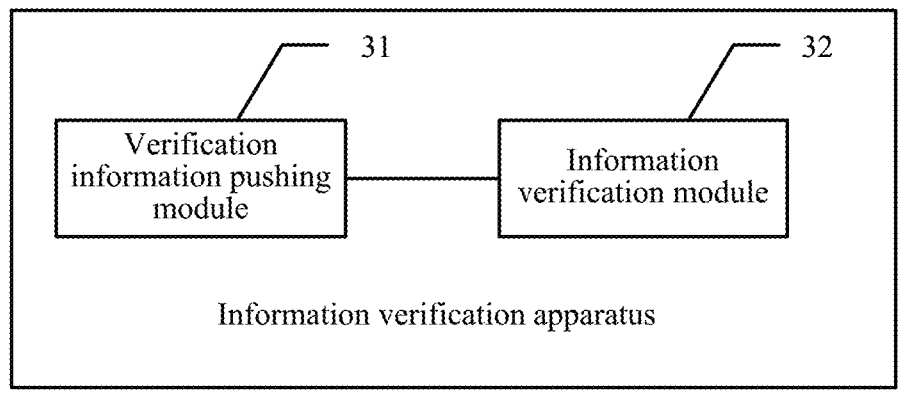
FIG. 15 is a schematic structural diagram of an information verification apparatus according to an embodiment of the present disclosure.

FIG. 15 is a schematic structural diagram of an information verification apparatus according to an embodiment of the present disclosure. The apparatus in the embodiment of the present disclosure may be arranged in a service provider device used by a service providing user that provides related services. The service provider device may include a personal computer, a notebook computer, and even a server. The apparatus may specifically be arranged in the first terminal 201 in the system shown in FIG. 14. The apparatus includes:

a verification information pushing module 31, configured to generate verification information when detecting a verification event, and generate a pushing request and send the pushing request to an application server. The pushing request includes a target application account and the verification information; and an information verification module 32, configured to receive verification reply information returned according to the pushing request. The verification reply information includes a corresponding to-be-verified service identification used for indicating the verification event and user verification information; verify the user verification information according to verification information generated for the target application account, and determine a to-be-verified service of the target application account according to the to-be-verified service identification after the verification succeeds, so as to respond to the detected verification event.

Reference may be made to description of the embodiments corresponding to FIG. 1 to FIG. 14 for a specific implementation of the verification information pushing module 31.

In a client that receives the verification information, a user may manually input the verification information and the to-be-verified service identification to return the verification reply information. The to-be-verified service identification indicates a specific to-be-verified service by using a specified letter abbreviation or number, for example, for a certain instant messaging registering service, an abbreviation of a name of the instant messaging application may be carried to serve as a to-be-verified service identification. Correspondence between to-be-verified service identifications and services is indicated by presetting a negotiating table.

After receiving the verification reply information, the information verification module 32 searches, according to a user account that sends the verification reply information, for latest verification information generated for the user account, and compares one by one the verification information with the user verification information in the verification reply information. If consistent, the verification succeeds. The information verification module 32 determines a to-be-verified service of the target application account according to the to-be-verified service identification; and finally responds to the verification event detected in step 601, so as to complete services, such as account registering and downloading.

Figure 16:
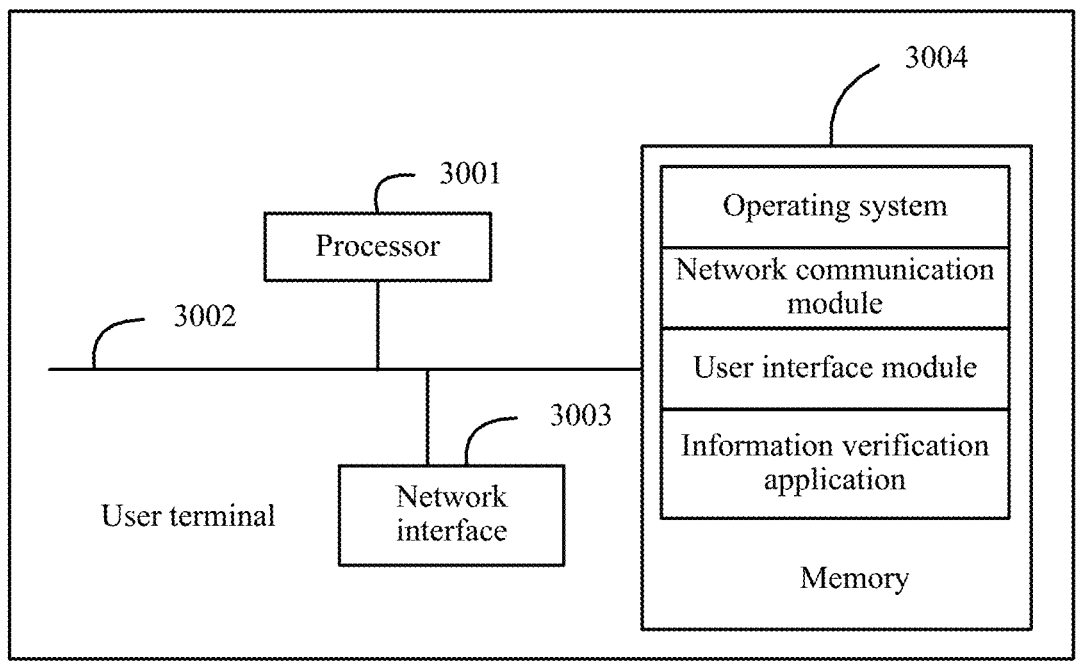
FIG. 16 is a schematic structural diagram of another user terminal according to an embodiment of the present disclosure.

Further, FIG. 16 is a schematic structural diagram of another user terminal according to an embodiment of the present disclosure. The user terminal according to the embodiment of the present disclosure includes: at least one processor 3001, for example a CPU, at least one communications bus 3002, at least one network interface 3003, and a memory 3004. The communications bus 3002 is configured to realize connection and communication between these components. Optionally, the network interface 3003 may include a standard wired interface, and a standard wireless interface (for example, a Wi-Fi interface or a mobile communication interface). The memory 3004 may be a high-speed RAM memory, and may also be a NVM (non-volatile memory), for example, at least one disk memory. Optionally, the memory 3004 may further be at least one memory apparatus far away from the processor 3001. As shown in FIG. 16, the memory 3004, as a computer storage medium, stores an operating system and a network communication module; and further stores an information verification application, and the like.

Specifically, the processor 3001 may be configured to invoke the information verification application stored in the memory 3004 to perform the following steps:

generating verification information when detecting a verification event;

generating a pushing request and sending the pushing request to an application server. The pushing request includes a target application account and the verification information;

receiving verification reply information returned according to the pushing request. The verification reply information includes a corresponding to-be-verified service identification used for indicating the verification event and user verification information; and verifying the user verification information according to verification information generated for the target application account, and determining a to-be-verified service of the target application account according to the to-be-verified service identification after the verification succeeds, so as to respond to the detected verification event.

In the embodiment of the present disclosure, generated verification information may be sent to a corresponding application server by using a messaging application channel, such as an instant messaging application; and the application server sends, based on an application account, the verification information to a related terminal; thereby implementing pushing of verification information in a current application scenario, such as an instant messaging application, or a social messaging application; ensuring verification accuracy; and to some extent ensuring security of information verification and network security.

Figure 17:
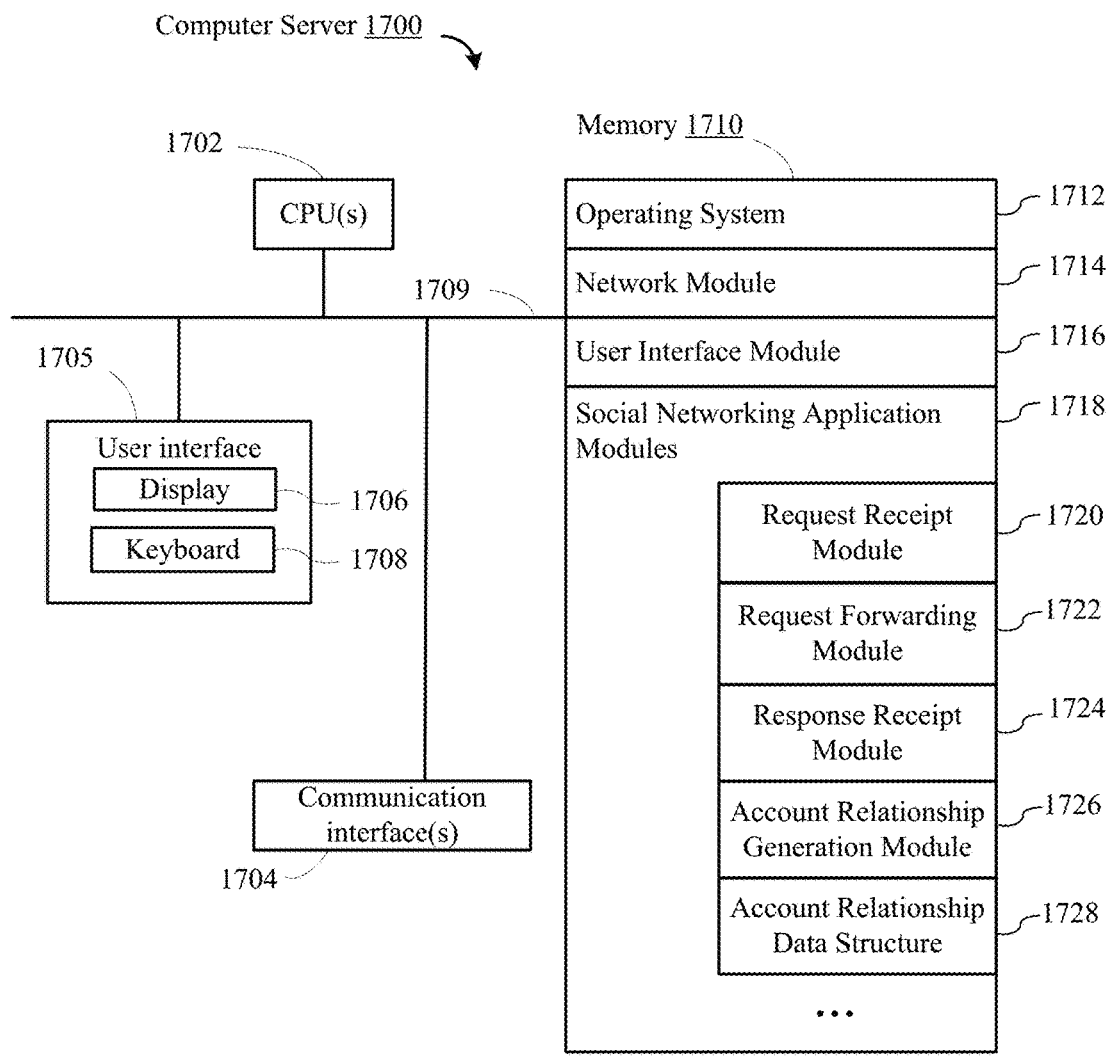
FIG. 17 is a schematic structural diagram of a computer server according to an embodiment of the present disclosure.

FIG. 17 is a block diagram of a computer server in accordance with some implementations of the present disclosure. The exemplary computer server 1700 typically includes one or more processing units (CPU's) 1702, one or more network or communications interfaces 1704, memory 1710, and one or more communication buses 1709 for interconnecting these components and with other computer systems (e.g., the first and second terminals). The communication buses 1709 may include circuitry (sometimes called a chipset) that interconnects and controls communications between system components. The computer server 1700 may optionally include a user interface 1705, for instance, a display 1706, and a keyboard 1708. Memory 1710 may include high speed random access memory and may also include non-transitory computer readable medium, such as one or more magnetic disk storage devices. Memory 1710 may include mass storage that is remotely located from the CPU's 1702. In some implementations, memory 1710 stores the following programs, modules and data structures, or a subset or superset thereof:

an operating system 1712 that includes procedures for handling various basic system services and for performing hardware dependent tasks;

a network module 1714 that is used for connecting the computer server 1700 to the client terminals and other computer systems via one or more communication networks (wired or wireless), such as the Internet, other wide area networks, local area networks, metropolitan area networks, and so on;

a user interface module 1716 configured to receive user inputs through the user interface 1705;

and a number of social networking application modules 1718 including the following:

a request receipt module 1720 as described above for receiving an identity verification request from a first terminal, wherein the first terminal is associated with a first account of the social networking application and the identity verification request includes information of a verification code and a second account of the social networking application;

a request forwarding module 1722 as described above for forwarding information of the verification code to a second terminal associated with the second account of the social networking application;

a response receipt module 1724 as described above for receiving a response from the second terminal;

an account relationship generation module 1726 as described above for, after verification of the response from the second terminal using the verification code, establishing a relationship between the first account and the second account such that the second terminal can interact with the first terminal through the social networking application; and an account relationship data structure 1728 as described above for hosting the relationships between the first account associated with the first terminal and the second account associated with the second terminal.

While particular embodiments are described above, it will be understood it is not intended to limit the disclosure to these particular embodiments. On the contrary, the disclosure includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the disclosure herein is for the purpose of describing particular embodiments only and is not intended to be limiting of the disclosure. As used in the description of the disclosure and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

What is claimed is:

1. A method of verifying identity information using a social networking application performed at a computer server having one or more processors and memory storing programs executed by the one or more processors, the method comprising:

receiving, by the computer server, an account registering event from a mobile phone, wherein:
 the account registering event is generated in response to the mobile phone scanning a 2D bar code displayed on a vending machine; and
 the account registering event includes a first account of the social networking application associated with the vending machine and a second account of the social networking application associated with the mobile phone;

in response to the account registering event, receiving, by the computer server, an identity verification request from the vending machine to verify an identity of the mobile phone, wherein the identity verification request includes information of a verification code that is randomly generated by the vending machine for confirmation by a user of the mobile phone;

after receiving the identity verification request from the vending machine:
 extracting, by the computer server, the verification code from the identity verification request in a form of a set of alphanumerical characters;
 generating, by the computer server, an audio stream using the set of alphanumerical characters; and
 forwarding, by the computer server, the information of the verification code including the audio stream to the mobile phone, wherein the mobile phone is configured to play the audio stream;

receiving, by the computer server, a response from the mobile phone, wherein the response is generated by the mobile phone based on an input of the user and in accordance with the verification code;

sending, by the computer server, the response from the mobile phone to the vending machine for verification at the vending machine, wherein the vending machine is configured to perform the verification of the response by:
 configuring the vending machine to extract a code from the response;
 comparing the extracted code with the verification code; and
 generating a verification result based on the comparison;

receiving, by the computer server, the verification result from the vending machine; and after verification of the response from the mobile phone using the verification code, establishing, by the computer server, a relationship between the first account and the second account such that the mobile phone can interact with the vending machine through the social networking application.

2. The method of claim 1, further comprising:
before receiving the identity verification request from the vending machine:
  receiving an authorization request from the vending machine, the authorization request including information of the first account of the social networking application;
  after approval of the authorization request:
    defining a data structure for hosting relationships between the first account and other accounts of the social networking application; and
    designating an application programming interface for the vending machine to transmit the identity verification request.

3. The method of claim 2, wherein establishing a relationship between the first account and the second account further includes generating an entry in the data structure, the entry including information of the first account and the second account, the method further comprising:
  receiving a service request from the mobile phone, the service request including information of a service code and the first account and the second account;
  querying the data structure for an entry corresponding to the service request; and
  after identifying the entry corresponding to the service request, sending the service code to the vending machine, wherein the vending machine is configured to perform a service in accordance with the service code.

4. The method of claim 2, wherein establishing a relationship between the first account and the second account further includes generating an entry in the data structure, the entry including information of the first account and the second account, the method further comprising:
  receiving a service request from the vending machine, the service request including information of a service code and the first account and the second account;
  querying the data structure for an entry corresponding to the service request;
  after identifying the entry corresponding to the service request, sending a confirmation request to the mobile phone;
  receiving a confirmation response from the mobile phone; and
  sending a service instruction to the vending machine in accordance with the confirmation response.

5. The method of claim 4, further comprising:
receiving a service completion message from the vending machine; and
forwarding the service completion message to the mobile phone.

6. A computer system, comprising:
one or more processors;
memory; and
one or more programs modules stored in the memory and configured for execution by the one or more processors, the one or more program modules including:
  a request receipt module for:
    receiving an account registering event from a mobile phone, wherein:
      the account registering event is generated in response to the mobile phone scanning a 2D bar code displayed on a vending machine; and
      the account registering event includes a first account of the social networking application associated with the vending machine and a second account of the social networking application associated with the mobile phone; and
    in response to the account registering event, receiving an identity verification request from the vending machine to verify an identity of the mobile phone, wherein the identity verification request includes information of a verification code that is randomly generated by the vending machine for confirmation by a user of the mobile phone;
  a request forwarding module for:
    after receiving the identity verification request from the vending machine:
      extracting the verification code from the identity verification request in a form of a set of alpha-numerical characters;
      generating an audio stream using the set of alpha-numerical characters; and
      forwarding the information of the verification code including the audio stream to the mobile phone, wherein the mobile phone is configured to play the audio stream;
  a response receipt module for receiving a response from the mobile phone, wherein the response is generated by the mobile phone based on an input of the user and in accordance with the verification code;
  the request forwarding module for:
    sending the response from the mobile phone to the vending machine for verification at the vending machine, wherein the vending machine is configured to perform the verification of the response by:
      configuring the vending machine to extract a code from the response;
      comparing the extracted code with the verification code; and
      generating a verification result based on the comparison; and
    receiving the verification result from the vending machine; and
  an account relationship generation module for:
    after verification of the response from the mobile phone using the verification code, establishing a relationship between the first account and the second account such that the mobile phone can interact with the vending machine through the social networking application.

7. The computer system of claim 6, wherein the one or more program modules further include instructions for:
before receiving the identity verification request from the vending machine:
  receiving an authorization request from the vending machine, the authorization request including information of the first account of the social networking application;
  after approval of the authorization request:
    defining a data structure for hosting relationships between the first account and other accounts of the social networking application; and
    designating an application programming interface for the vending machine to transmit the identity verification request.

8. The computer system of claim 7, wherein the account relationship generation module is further configured to:
generate an entry in the data structure, the entry including information of the first account and the second account;

receive a service request from the mobile phone, the service request including information of a service code and the first account and the second account;

query the data structure for an entry corresponding to the service request; and send the service code to the vending machine after identifying the entry corresponding to the service request, wherein the vending machine is configured to perform a service in accordance with the service code.

9. The computer system of claim 7, wherein the account relationship generation module is further configured to:

generate an entry in the data structure, the entry including information of the first account and the second account;

receive a service request from the vending machine, the service request including information of a service code and the first account and the second account;

query the data structure for an entry corresponding to the service request;

send a confirmation request to the mobile phone after identifying the entry corresponding to the service request;

receive a confirmation response from the mobile phone; and send a service instruction to the vending machine in accordance with the confirmation response.

10. The computer system of claim 9, wherein the one or more program modules further include instructions for:

receiving a service completion message from the vending machine; and forwarding the service completion message to the mobile phone.

11. A non-transitory computer readable storage medium having stored therein one or more instructions, which, when executed by a computer system, cause the computer system to:

receive an account registering event from a mobile phone, wherein:

the account registering event is generated in response to the mobile phone scanning a 2D bar code displayed on a vending machine; and the account registering event includes a first account of the social networking application associated with the vending machine and a second account of the social networking application associated with the mobile phone;

in response to the account registering event, receive, by the computer system, an identity verification request from the vending machine to verify an identity of the mobile phone, wherein the identity verification request includes information of a verification code that is randomly generated by the vending machine for confirmation by a user of the mobile phone;

after the receive the identity verification request from the vending machine:

extract, by the computer system, the verification code from the identity verification request in a form of a set of alphanumerical characters;

generate, by the computer system, an audio stream using the set of alphanumerical characters; and forward, by the computer system, the information of the verification code including the audio stream to the mobile phone, wherein the mobile phone is configured to play the audio stream;

receive, by the computer system, a response from the mobile phone, wherein the response is generated by the mobile phone based on an input of the user and in accordance with the verification code;

send, by the computer system, the response from the mobile phone to the vending machine for verification at the vending machine, wherein the vending machine is configured to perform the verification of the response by:

configuring the vending machine to extract a code from the response;

comparing the extracted code with the verification code; and generating a verification result based on the comparison;

receive, by the computer system, the verification result from the vending machine; and after verification of the response from the mobile phone using the verification code, establishing a relationship between the first account and the second account such that the mobile phone can interact with the vending machine through the social networking application.

* * * * *